United States Patent [19]
Kreysar et al.

[11] Patent Number: 5,931,576
[45] Date of Patent: Aug. 3, 1999

[54] OPTICAL COUPLER FOR DISTRIBUTIVE LIGHTING SYSTEM

[75] Inventors: Douglas F. Kreysar, West Bloomfield; Ben Wang, Farmington, both of Mich.; David R. Jenkins, Chicago, Ill.

[73] Assignee: North American Lighting, Inc., Farmington Hills, Mich.

[21] Appl. No.: 08/805,773

[22] Filed: Feb. 25, 1997

Related U.S. Application Data

[60] Provisional application No. 60/012,230, Feb. 26, 1996.

[51] Int. Cl.⁶ .................................................. F21V 8/00
[52] U.S. Cl. ........................ 362/552; 362/556; 362/558; 362/581
[58] Field of Search ................. 362/32, 31, 61, 362/511, 552, 554, 556, 558, 581; 385/31, 39

[56] References Cited

U.S. PATENT DOCUMENTS

| | | |
|---|---|---|
| Re. 34,318 | 7/1993 | Davenport et al. . |
| 4,389,698 | 6/1983 | Cibie . |
| 4,811,172 | 3/1989 | Davenport et al. . |
| 4,868,718 | 9/1989 | Davenport et al. . |
| 4,949,227 | 8/1990 | Finch et al. . |
| 4,958,263 | 9/1990 | Davenport et al. . |
| 5,058,985 | 10/1991 | Davenport et al. . |
| 5,147,128 | 9/1992 | Windross ................................. 362/32 |
| 5,184,882 | 2/1993 | Davenport et al. . |
| 5,184,883 | 2/1993 | Finch et al. ............................... 362/32 |
| 5,217,290 | 6/1993 | Windross . |
| 5,222,793 | 6/1993 | Davenport et al. . |
| 5,222,794 | 6/1993 | Windross ................................. 362/32 |
| 5,257,168 | 10/1993 | Davenport et al. . |
| 5,311,410 | 5/1994 | Hsu et al. . |
| 5,343,367 | 8/1994 | Davenport et al. . |
| 5,367,590 | 11/1994 | Davenport et al. . |
| 5,369,554 | 11/1994 | Erion .......................................... 362/32 |
| 5,416,669 | 5/1995 | Kato et al. ................................. 362/32 |
| 5,434,756 | 7/1995 | Hsu et al. ................................. 362/32 |
| 5,436,806 | 7/1995 | Kato . |
| 5,465,194 | 11/1995 | Currie ....................................... 362/32 |
| 5,479,545 | 12/1995 | Davenport et al. ....................... 362/32 |
| 5,488,545 | 1/1996 | Kato et al. ................................. 362/32 |
| 5,499,168 | 3/1996 | Cochard et al. .......................... 362/32 |
| 5,515,242 | 5/1996 | Li ............................................... 362/32 |
| 5,515,243 | 5/1996 | Cassarly et al. .......................... 362/32 |
| 5,548,490 | 8/1996 | Smith et al. .............................. 362/32 |
| 5,550,716 | 8/1996 | Dassanayake et al. ................... 362/32 |
| 5,559,911 | 9/1996 | Forkner et al. ........................... 362/32 |
| 5,560,699 | 10/1996 | Davenport et al. ....................... 362/32 |
| 5,575,551 | 11/1996 | Horii ......................................... 362/32 |
| 5,626,412 | 5/1997 | Kato et al. ................................. 362/32 |

*Primary Examiner*—Y. Quach
*Attorney, Agent, or Firm*—McDonnell Boehnen Hulbert & Berghoff

[57] ABSTRACT

A headlamp for a vehicle includes a holder for a light-distribution optical fiber of the type that has an output end emanating light of known spatial-intensity distribution, an optical coupler that has an input end adjacent the holder and includes a plurality of elements, each of which is positioned to receive light from a selected area of the light of known spatial intensity distribution and to alter the intensity or spatial distribution of that light to provide a predetermined spatial intensity distribution at an output of said coupler, and a projection lens to project the predetermined spatial intensity distribution to a desired illumination pattern. The optical coupler may be in the form of a mask and one or more filters or may be a number of light-transmitting elements that carry light from one spatial part of the input to a different spatial part in the output. In general, the optical coupler alters the intensity or angular distribution of the light pattern at the input to produce a desired light pattern at the output for projection onto the road by the projection lens.

13 Claims, 8 Drawing Sheets

OPTICAL COUPLER FOR DISTRIBUTIVE LIGHTING SYSTEM

CROSS REFERENCE TO RELATED APPLICATION

This application claims the benefit of Provisional Patent Application No. 60/012,230, which was filed on Feb. 26, 1996.

TECHNICAL FIELD

This invention relates to the art of optical illumination systems. In particular the invention relates to the art of distributive lighting systems for automotive forward lighting.

BACKGROUND

A distributive lighting system for automotive exterior lighting generally includes a high intensity discharge (HID) light source, a large-core optical fiber light pipe or fiber bundle, and a collection system to couple light into the optical fiber. The system may utilize a single fiber, or multiple fibers may be branched from the same light source. The minimum photometric purpose of an automotive exterior lighting lamp package, the optical system connected to the output end of a distributive lighting system, is the projection of visible light at angles and luminous intensities (candela) that comply with automotive exterior lighting photometry requirements.

A distributive lighting system coupled to an efficient low beam head-lamp package has advantages over conventional tungsten-halogen head lamp packages. Typical distributive lighting systems are capable of delivering 796 to 1505 lumens to a lamp package while consuming only 35 W of electrical power per lamp. A typical sealed beam or composite head lamp supplies 350 to 450 lumens to the beam pattern region using a 55 W tungsten-halogen source. A lamp package optical efficiency greater than 40% would provide increased optical performance with lower power consumption than current tungsten-halogen lamps.

Incremental improvements in automotive lighting have increased demand for improved durability, safety, and styling of exterior lighting systems. The quality of head lamp performance beyond government requirements is further specified by both OEMs and their customers. Photometry tests required in the Federal Motor Vehicle Safety Standards (FMVSS 108) and night driving experience provide the following criteria for low beam head lamps:

1. Down-the-road lighting
2. Glare light control above the horizontal
3. Horizontal beam spread
4. Foreground illumination
5. Beam pattern uniformity These criteria may be extended into the following design guidelines:

1. In general, the more luminous flux directed down-the-road, the better the down-the-road illumination.
2. In general, the less luminous flux directed above the horizontal, the better the glare light control.
3. Light must be spread at least enough to meet the 850 candela minimum luminous intensity specified at the 2D-15L and 2D-15R test points. In addition, wider horizontal spread in the beam pattern is generally desirable.
4. Light must be directed below horizontal at least enough to provide uniform lighting at the driver's perceived area directly in front of the vehicle.
5. Uniformity of the beam pattern is generally considered to be a positive, although subjective, performance characteristic by the customer.

The key to designing any low beam head lamp which meets legal and customer photometric performance standards lies chiefly in meeting these five design guidelines.

The design approaches to meet the low beam guidelines may be classified according to the light collection method. For example, one may use a reflector, an aspheric lens, or a plastic light guide. Projector lamp approaches have an advantages over reflector approaches in that they are feed forward systems. Feed forward systems do not require two reflective surfaces and thereby eliminate lamp geometry concerns of shadowing due to mirror placement. Also, the projector lens approaches yield superior glare light control, and better beam pattern uniformity. Thus, while the discussion below refers primarily to low beam lamp packages which utilize a projector lens as the primary light collecting component, it should be understood that other approaches are possible.

Performance of an optical system generally depends on (1) the numerical aperture of the output end of the distributive lighting system, which is the numerical aperture of the input to the lamp package, (2) the diameter of the optical fiber core, (3) the total luminous flux emitted from the fiber, and (4) the lumen density (lumens/mm$^2$) across the output face of the fiber. Each of these will be discussed in turn.

The numerical aperture of the light emitted from a straight optical fiber is:

$$NA = n_o \sin\theta_{max} = (n_f^2 - n_c^2)^{1/2}$$

where $n_o$ is the index of refraction of air, $-\theta_{max}$ is the maximum acceptance angle of the optical fiber-core cladding interface, $n_f$ is the index of refraction of the cladding, and $n_c$ is the index of refraction of the optical fiber core. If $n_o$ is taken to be equal to 1.0, then the NA is simply equal to the sine of the maximum acceptance angle of the optical fiber.

In practice, calculating the NA based on indices of refraction does not always prove to be useful for two reasons. First, styling guidelines often require that the lamp package height be limited. Some balance must often be struck between the light collected by the aspheric lens in a lamp package and the maximum allowable height of the lamp package. Limiting the height of the aspheric lens may sacrifice a portion of the light emitted from the fiber since it is not always possible to increase the numerical aperture of the lamp optical system. Second, the angular distribution of the luminous flux coupled into the optical fiber provides more light at smaller angles that at larger angles. Therefore, there may be very little light available at the larger angles for the lamp package. Light at the larger angles may also be limited by bends in the fiber, which force the rays at larger angles to escape from the fiber core.

Establishing the numerical aperture for a lamp design that both satisfies the package height requirements and sacrifices only a small portion of the available luminous flux is often necessary. In one example where the input pattern was Gaussian, only twenty percent of the available luminous flux was lost when the numerical aperture was reduced from 0.66 to 0.45. This allowed the required lens diameter to be reduced from 79 mm to 45 mm.

A small numerical aperture for light emitted from the fiber is desirable for designs that require lenses to collect the light. The smaller the numerical aperture, the smaller is the lens diameter required to capture available light. Small numerical apertures allow for longer lens focal lengths and, therefore, larger manufacturing tolerances. Larger numerical apertures have the advantage of shorter focal lengths, which decreases lens lamp package depth. Clearly, compromises must be made in determining the lens design NA and focal length of the optical system.

The lumen distribution across the output surface of the fiber core is critical to the optical design. The output surface of the optical fiber may be described by the source distribution function S(x,y), which describes the lumens per mm² at x,y coordinates on the fiber output surface. A source lumen distribution located at the focal distance from an aspheric lens and whose luminous flux is completely collected by an aspheric lens is transformed into an angular intensity distribution $-1(\theta,\phi)$ as:

$$I(\theta,\phi) = T\{S(x,y)\}$$

$$x = f \tan\theta$$

$$y = f \tan\phi$$

The transformation function T may be approximated by the following substitutions:
where "f" is the focal length of the aspheric lens and a constant for unit conversion is also applied.

The goal of designing an optical configuration which projects an angular intensity distribution in the far field that meets our evaluation criteria can be reduced to achieving the desired $-1(\theta,\phi)$. As can be seen from the above formulas, the choice of S(x,y) and f determines $-1(\theta,\phi)$. Therefore, the degree to which we are able to control S(x,y) is the degree to which we are able to control the hot spot intensity, down the road light, glare light, beam pattern uniformity, and beam spread angles.

Several techniques are known for collecting light from an optical fiber and forming it into a desired pattern. One such technique is to reflect light emerging from the fiber off two flat mirrors in a V-configuration into a standard head lamp parabolic reflector. The mirror and reflector collect and quasi-collimate the light from the fiber. An array of small lenslets forms a cover lens, which controls the angular output from the lamp package to form a legal beam pattern.

Another approach utilizes an optical fiber and a lamp device with no additional optics to form the beam pattern. Such a device is shown, for example, in U.S. Pat. No. 5,436,806 (Kato) and includes a lamp device that has a light bending and conducting path and light conducting, path lenses that produce the desired light distribution.

Yet another arrangement includes an optical structure in the form of at least one step affixed to the end of the output end of a light conductor. The step provides an output face located at the focal point of a projector lens, while the remaining parts of the light conductor or the optical structure are displaced from the focal point and, thus, spread by the projector lens because they are out of focus. An optical structure having more than one step may be used to generate light sources at various distances from the focal plane of the projection lens, but this optical structure does not include individual light conducting paths and cannot truly redistribute the light pattern. An example of such a system is shown in U.S. Pat. No. 5,257,168 (Davenport).

Still another system (e.g., that shown in U.S. Pat. No. 5,184,882 to Davenport) employs a plurality of elongated light conductors to conduct light from a central source of light to a projection lens, which, in turn, projects the desired light pattern on the road. This system is complex and expensive because it requires a bundle of several long fibers that extend from the central light source to the projection lens. Because the long fibers are specifically designed for one particular application, e.g., a vehicle headlamp, this system does not permit use of off-the-shelf or easily interchanged parts.

Other known systems are multi-channel systems that use a plurality of fibers, each of which is associated with an individual projection lens element

SUMMARY OF THE INVENTION

In accordance with the invention, a forward lighting lamp package for a vehicle comprises means for removably engaging the output end of a large, light distribution fiber, an optical coupler for receiving light from the output end of the fiber, and a projection lens for projecting a light pattern forward of the vehicle. The optical coupler transforms the spatial light pattern provided by the light distribution fiber into a spatial light pattern that is optimum for the projection lens to provide the desired projected light pattern, which is typically that dictated by Federal regulations.

The optical coupler may take various forms. For example, the coupler may comprise a plurality of light guides, each of which receives a particular part of the pattern from the end of the fiber and transforms it into the shape and position required by the projection lens to create a particular part of the desired light pattern. In this embodiment, the light guides transmit light by total internal reflection and provide the desired light intensity of the desired numerical aperture and at the desired location. In one embodiment, the output coupler for controlling the lumen density across the output surface of the coupler comprises three total internal reflection light guides for creating a spatially-dependent intensity pattern similar to that required by low beam photometry standards when projected through the lens. One of the light guides provides the highest lumen density, while the outer light guides have lower densities.

In accordance with a preferred embodiment, a forward lighting lamp package for a vehicle comprises means for receiving the output end of a large, light distribution fiber, an optical coupler in the form of a mask, and a projection lens in the form of an aspheric lens and a spread lens.

In accordance with a method of the invention, the source distribution function S(x,y) is selected to be one that will produce the desired projection pattern with the desired projection lens. That is, the lens and pattern are first specified and the S(x,y) required to produce that pattern with that lens is then calculated with a ray tracing program. The desired S(x,y) distribution is provided by the optical coupler light guide that is placed between the output end of the light distribution fiber and the focal plane of the projection lens.

An output coupler in accordance with the invention can be viewed as having two functions:

1. Controlling the flux distribution from the optical fiber.
2. Controlling the angular distribution emitted from the lamp package.

Lumen density at the output surface is mostly dependent on the total input flux allowed into the individual coupler light guides from the fiber, the angular distribution of the light emitted from the fiber, the index of refraction of the light guides, the efficiency of the coupler geometry, and Fresnel reflection losses at the coupler input and output. Each piece of the coupler is designed to take a fraction of the output flux from the fiber and transform this coupler output flux into the desired lumen density at the coupler output. This is accomplished by altering the ratio of input surface area to output surface area. Once again a balance must be reached, in this case between the desired coupler dimensions and the losses due to light exceeding the numerical aperture of the light guide.

As was seen above, the angular distribution from a lamp package employing an i aspheric lens is highly dependent on the dimensions of the emitting source surface. The fact that approximately 70% of the low beam flux should lie between 0.5 U and 4.0 D is an important constraint on output coupler vertical dimensions. It is evident, however, from the formulations above that the angular distribution of the lamp package may be controlled by proper selection of the dimensions of the output coupler. Angular distribution in the vertical dimension can be decreased by decreasing the vertical dimensions of the output coupler. Angular distribution in the horizontal dimension can be increased, to help achieve the required spread to meet the 850 cd. requirements at 2D, 15L and 15R, by increasing the horizontal dimensions of the output coupler.

In one embodiment of the invention, a 2-branch distributive lighting system that closely approximates the measured angular intensity distribution emitted from a 12.7 mm diameter plastic fiber core was modeled in an optical ray tracing software package An optical output coupler was then designed using the optical simulation software such that the output flux collected by a projector lens produced a beam pattern that satisfied all customer and Federal requirements. An iterative design process was used to optimize system optical efficiency by balancing losses due to coupler geometry and beam pattern performance criteria.

In another embodiment of the invention, the end of the optical fiber is covered with a spatial filter that produces the desired-distribution pattern at the output of the optical fiber. Further, the spatial filter may be used in conjunction with an optical coupler to provide the desired pattern.

BRIEF DESCRIPTION OF THE DRAWINGS

FIG. 6b shows the various parts of the mask of FIG. 6a.

DETAILED DESCRIPTION OF THE PREFERRED EMBODIMENTS

Figure 1A:
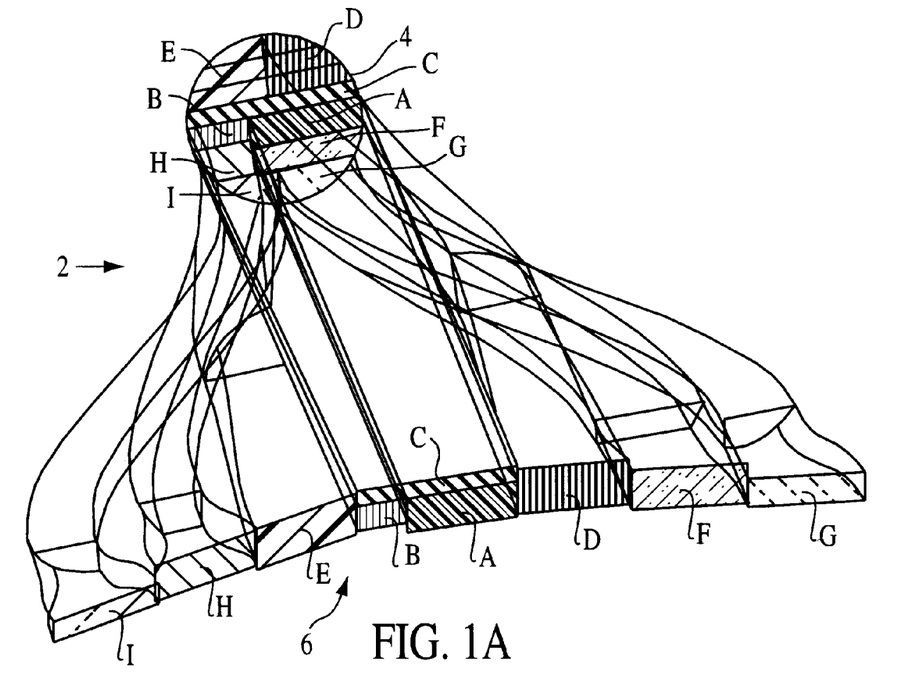
FIG. 1a is a perspective of an output coupler in accordance with the invention.
Figure 1B:
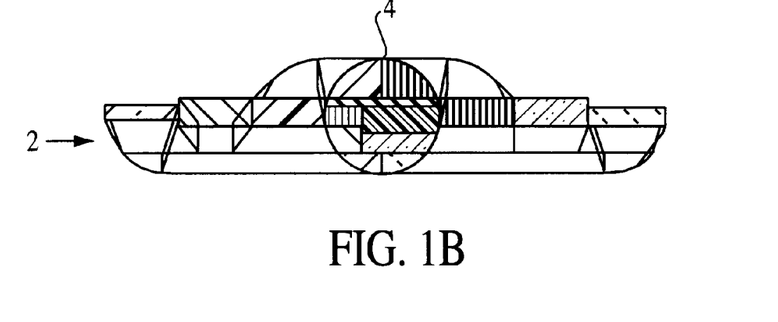
FIG. 1b is a front view of the coupler shown in FIG. 1A.
Figure 1C:
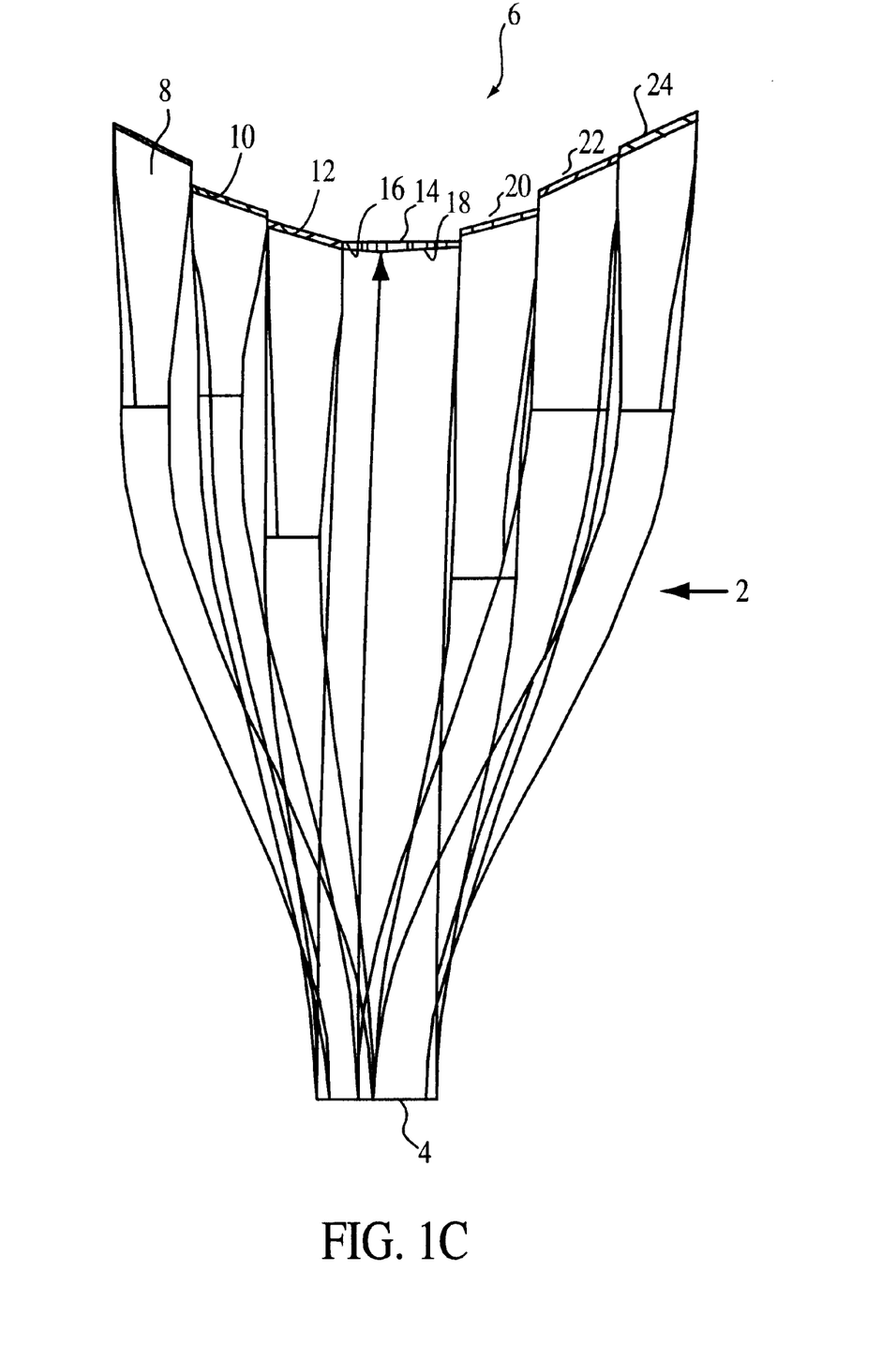
FIG. 1c is a top view of the coupler shown in FIG. 1A.
Figure 2A:
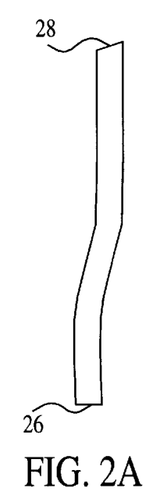
FIGS. 2a–e illustrate various possible shapes of optical couplers.
Figure 2B:
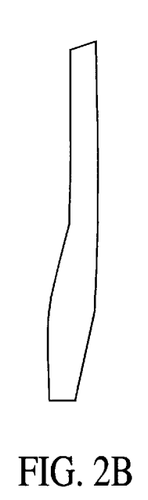
Figure 2C:
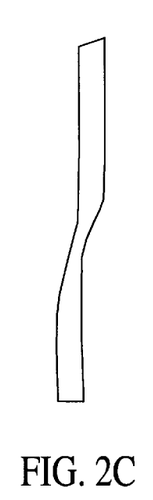
Figure 2D:
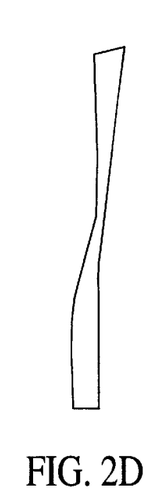
Figure 2E:
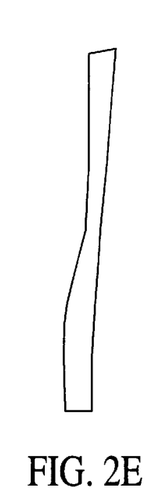

With reference to FIGS. 1a through 1c, an optical coupler 2 in accordance with the invention. The input end 4 of the coupler will be placed adjacent the output end of an optical fiber (not shown) of a distributive lighting system. The output end 6 of the coupler will be placed at the focal plane of the projection optics, such as a projection lens. The manner by which the light emitted from the end of the optical fiber is distributed to the focal point of the projection optics is an important feature of the invention. This is accomplished by first ascertaining the desired light projection pattern, e.g., the illumination down-the-road. This pattern is traced back through the projection optics to determine the pattern required at the end 6 of the coupler. Then, the light distribution at the end of the optical fiber is determined, and the input end 4 is divided into a plurality of areas. Light from each of these areas is then mapped into the appropriate location in the end 6 to provide the desired pattern.

In the embodiment illustrated in FIGS. 1a–c, the end 6 is divided into nine separate areas 8 through 24. These areas provide the necessary light for producing the desired light pattern. For example, area 14 is taken from a central area of the fiber, where the intensity is the greatest for an approximately Gaussian distribution of the fiber light distribution. This long, wide element extends forward from the center of the end 4 and is in the upper part of the output end 6. When a projection lens projects the light onto the road, it will invert the pattern at end 6 whereby the area 14 will be imaged as a broad area of higher intensity. The areas of the fiber that have lower light values, such as areas 8 through 12 and 20 through 24, are mapped to the outer portions of the end 6, and these are imaged to the background portions of the road pattern and in intensities that conform to customer and Federal requirements.

FIGS. 2a through 2e illustrate side views of several conceptual forms of the individual coupler elements. These elements may be straight or curved and may have rectangular ends, circular or semi-circular ends, or stepped ends. In general, the input ends 26 are not parallel to the output ends 28 because the input ends are designed to cooperate with the flat end of an optical fiber and the output ends are designed to provide a surface that corresponds with the angle suited to the particular projection lens. It will be appreciated that the elements shown in FIG. 2 illustrate that the coupler elements may be shaped to maintain total internal reflection within the curved areas of the elements.

Figure 3A:
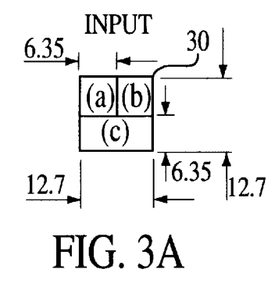
FIGS. 3a through 3c show a specific embodiment of an optical coupler in accordance with the invention.
Figure 3B:
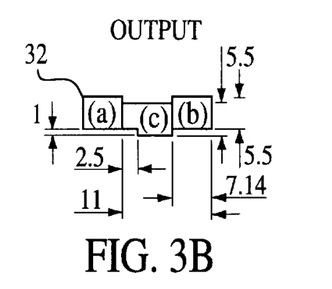
Figure 3C:
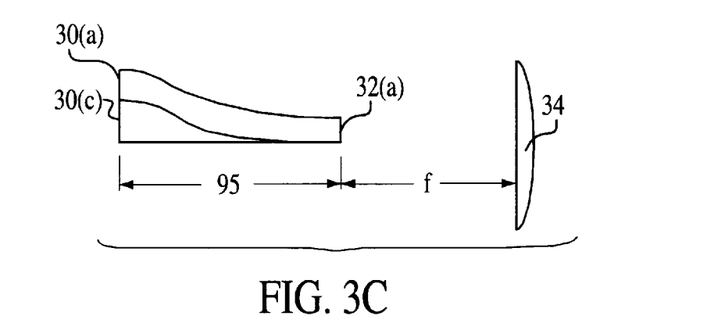

FIGS. 3a through 3c show a particular embodiment of a coupler where the input end 30 has been divided into three areas, a, b, and c. FIG. 3(a) is an elevation of the input end and shows that the areas a and b are taken from the upper part of the input end, and the area c is the lower half of the input end. In the embodiment shown, the input end is square and each side in 12.7 mm. The areas a and b are also square with each side being 6.35 mm. FIG. 3(b) shows the output end 32, which is arranged such that the areas 32(a) and 32(b) are rectangular and 5.5 mm in height and 7.14 mm in width. The central area 32(c) is 5.5 mm in maximum height but includes a step at the lower right corner that is 1 mm in height and 2.5 mm in width. This step is provided to shape the pattern that is projected on the road. The side view of the coupler and a projection lens 34 is shown in FIG. 3(c). The overall length of the coupler is 95 mm.

Figure 4A:
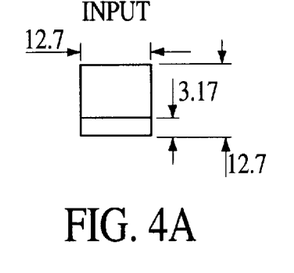
FIGS. 4a through 4c another specific embodiment in accordance with the invention.
Figure 4B:
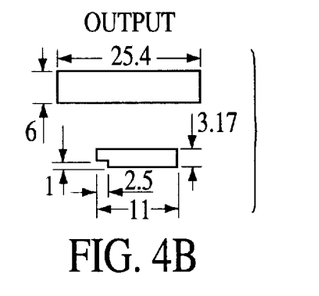
Figure 4C:
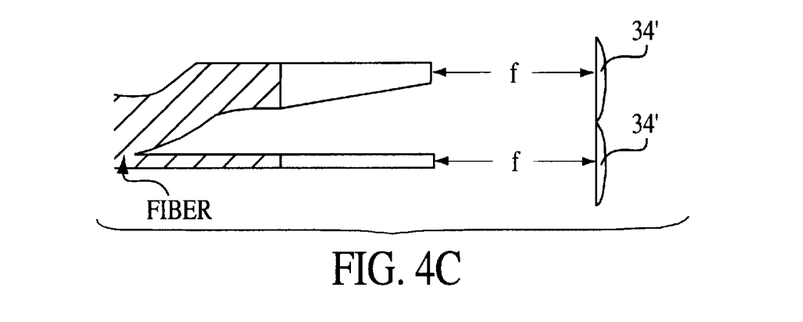

FIG. 4a through 4c shows another embodiment of an optical coupler in accordance with the invention. In this embodiment the input end is divided into two rectangular parts, each having a width of 12.7 mm. The lower part has a height of 3.17 mm, and the upper part has a height of 12.7 mm. As shown in FIG. 4b, the output ends of the parts are separated, which allows use of the two aspheric lenses, 34' shown in FIG. 4c. The output end of the upper part is rectangular with a height of 6 mm and a width of 25.4 mm. The output end of the lower part nominally has a height of 3.17 mm and a width of 11 mm and includes a step having a height of 1 mm and a width of 2.5 mm.

Figure 5:
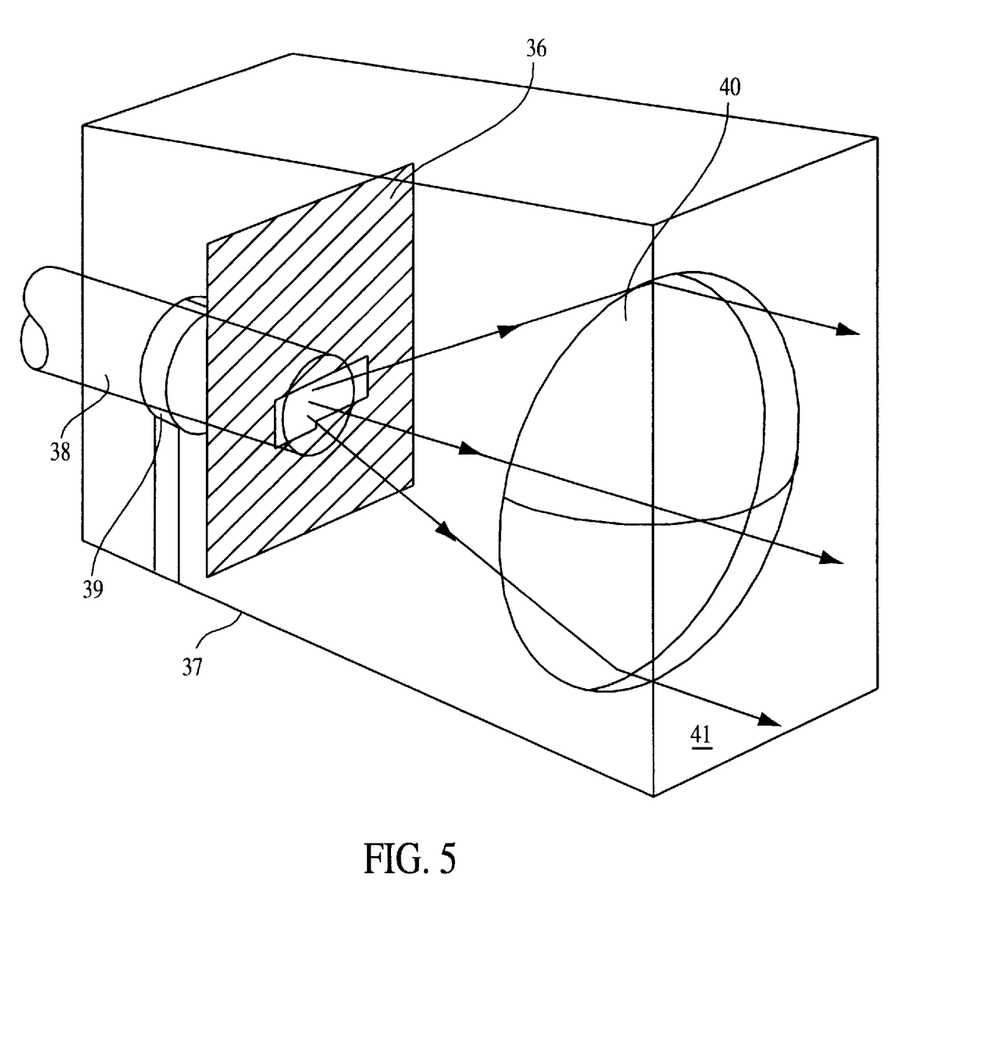
FIG. 5 is a schematic of an embodiment in accordance with the invention utilizing a mask.

FIG. 5 illustrates another embodiment of the invention wherein a mask 36 is placed over the end of an optical fiber 38 to provide the desired light pattern. The end of the fiber and the mask are preferably located with respect to the focal plane of a projection lens 40 such that the desired pattern is projected on the road. The projection lens is preferably aspheric with a focal length of 63.5 mm, but may be spherical as well. A spread lens follows the projection lens to spread the light to obtain the desired pattern on the road.

Preferably, the optical components of the invention are held in a housing, shown schematically at 37 in FIG. 5. This housing would be specifically shaped for a particular vehicle such that it can be installed in the opening provided during assembly of the vehicle or for replacement. The fiber 38, which is generally an existing part of the vehicle is engaged removably in a holder 39. The holder places the end of the fiber in the proper location for cooperating with the mask 36. Thus, the lamp package provided by the optical elements and the housing is installed by engaging the optical fiber and placing the housing in the vehicle opening.

Figure 6A:
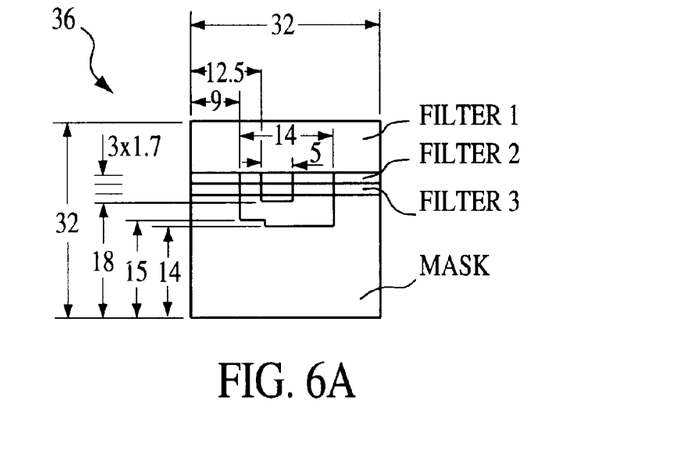
FIG. 6a shows a specific embodiment of a mask in accordance with the invention.
Figure 6B:
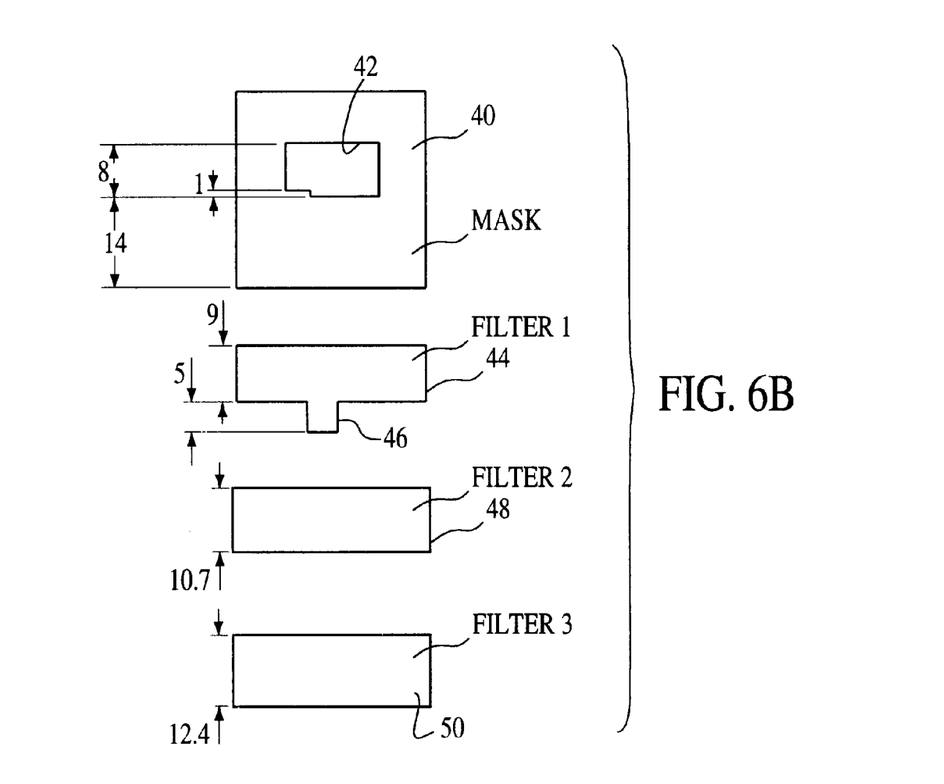

FIG. 6a is a front view of a preferred mask 36 in accordance with the invention. The mask is comprised of four elements as shown in FIG. 6b. The first element 40 is an opaque element 40 having an opening 42 therein. This opening is generally rectangular with a height of 9 mm and a width of 14 mm. A step having a height of 1 mm and a width of 3.5 mm is placed in the lower left corner. Three filters are placed on this mask to adjust the intensity of the light passing the mask. A first filter 44 includes a projection 46, which is square with a height of 5 mm. The left most edge of the projection 46 is spaced from the left most edge of the opening by 3 mm. A second filter 48 is a rectangle 10.7 mm in height and the third filter 50 is rectangular and 12.4 mm in height. FIG. 6a shows the condition when the three filters are placed over the opening 42.

Figure 7A:
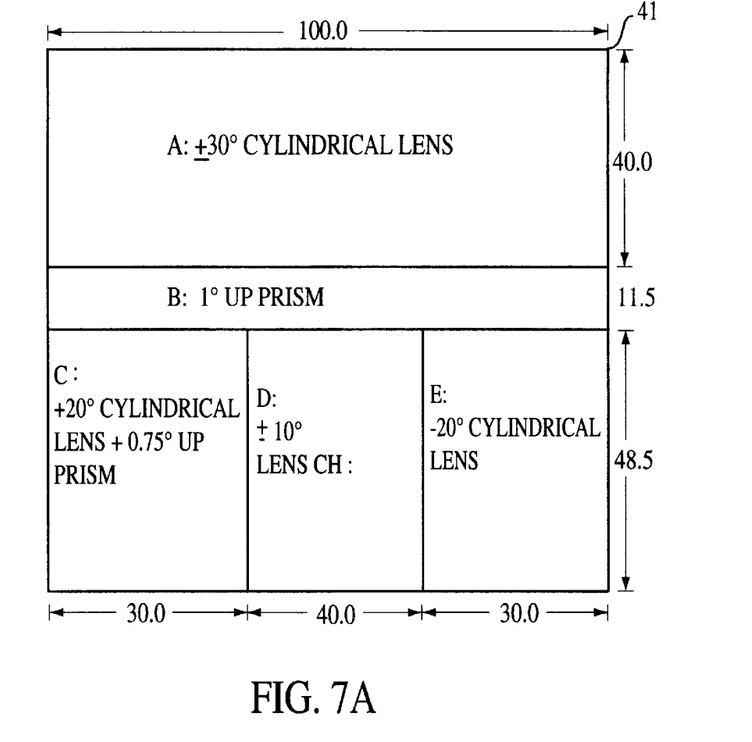
FIGS. 7a through 7f show a spread lens used in the embodiment of FIG. 5.
Figure 7B:
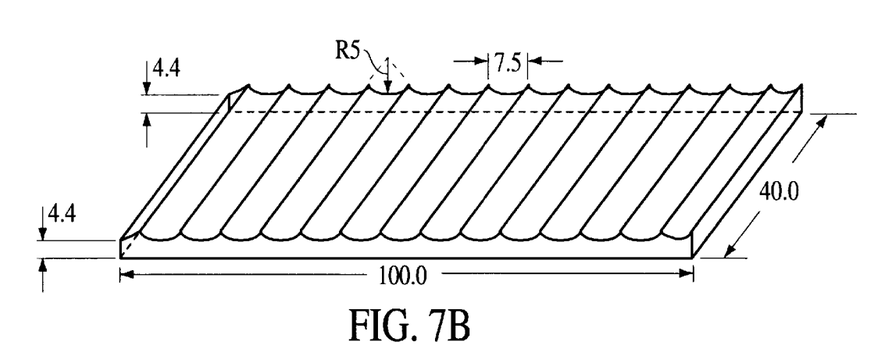
Figure 7C:
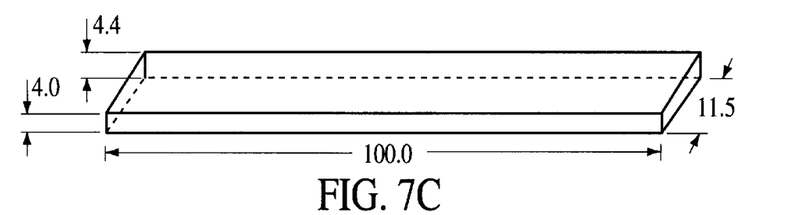
Figure 7D:
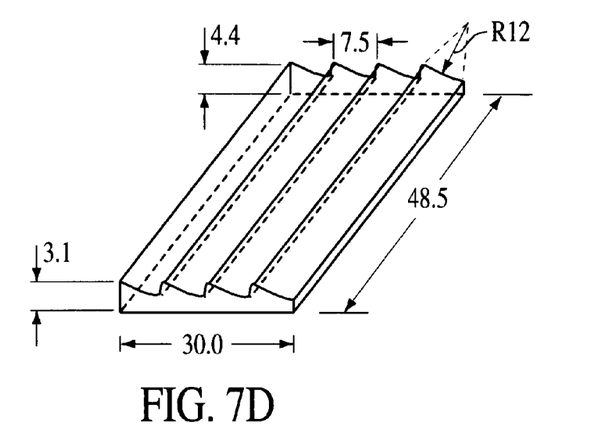
Figure 7E:
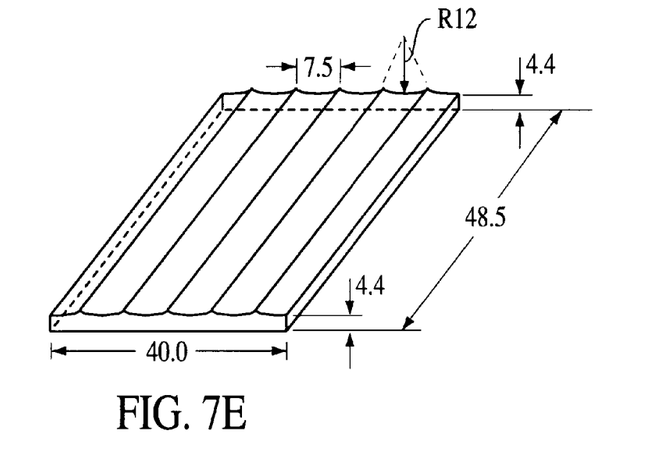
Figure 7F:
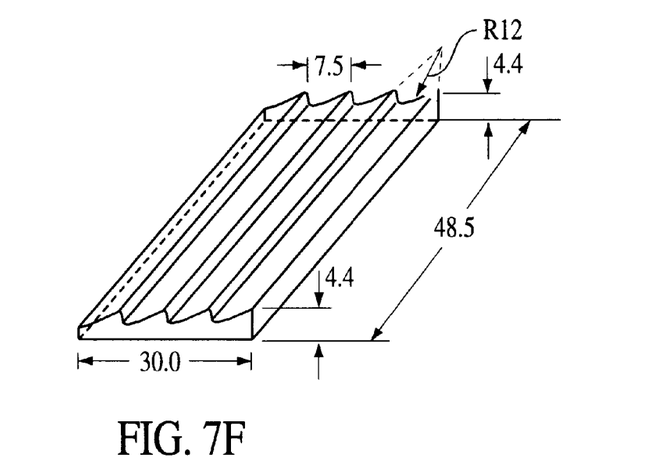

FIGS. 7a through 7f show a preferred embodiment of the spread lens 41 of FIG. 5. This lens is comprised of five parts. Part A is a cylindrical lens in the upper part of the spread lens and is shown in more detail in FIG. 7b. The lens of part A is a series of cylindrical lenses, each of which has a radius of curvature of 5 mm and a width of 7.5 mm. There is no prism in this lens, and the thickness of the lens is 4.4 mm. Part B of the spread lens provides only prism. This has a thickness of 4.4 mm at one side and 4 mm at the other side. Part C is shown in FIG. 7d. This is a cylindrical lens that has a plurality of cylindrical elements with a curvature of 12 mm and a width of 7.5 mm. There is no prism in this element. Part D is shown in FIG. 7e. This provides cylindrical elements with a radius of curvature of 12 mm and width of 7.5 mm. Part E is shown in FIG. 7f. This is series of cylindrical lenses, each having a radius of curvature of 12 mm and a width of 7.5 mm. The characteristics are summarized below.

| ELEMENT | HEIGHT (mm) | WIDTH (mm) | CHARACTERISTIC |
| --- | --- | --- | --- |
| A | 40 | 100 | ±30° (L–R) Cylindrical |
| B | 11.5 | 100 | 1° up Prism |
| C | 48.5 | 30 | +20° (R) Cylindrical |
| D | 48.5 | 40 | ±10° (L–R) Cylindrical |
| E | 48.5 | 30 | −20° (L) Cylindrical |

It will be appreciated that it is in the concept of the invention to use a mask 36 in conjunction with a coupler 2 as well. Further, the concepts described may be applied to other types of lamps as well as for vehicle lamps. When used in vehicle lamps, the invention may be applied to regular and high beams. Modifications within the scope of the appended claims will be apparent to those of skill in the art.

We claim:

1. A headlamp for a vehicle comprising:

means for receiving an output end of a light-distribution optical fiber carrying light from a light source located at an input end to provide light having a known spatial intensity distribution at said output end;

an optical coupler having an input and an output, said input of said optical coupler being located with respect to said means for receiving such that said known spatial intensity distribution is incident on said input of said optical coupler, said optical coupler comprising means for converting said known intensity distribution to a predetermined spatial intensity distribution at a predetermined location, and a projection lens for projecting said predetermined spatial intensity distribution to provide a desired illumination pattern wherein a mask is placed over the output of the coupler and having an opaque planar sheet with an opening therein in a geometric shape of said desired illumination pattern and a plurality of filters at least partially overlying said opening.

2. A headlamp according to claim 1 wherein said projection lens comprises an aspheric lens and a spread lens.

3. A headlamp according to claim 2 wherein said spread lens includes a first section providing a relatively small spread of light, a second section providing a relatively large spread of light, and a third section providing angular deflection of light.

4. A headlamp for a vehicle comprising:

means for receiving an output end of a light-distribution optical fiber carrying light from a light source located at an input end to provide light having a known spatial intensity distribution at said output end, an optical coupler having an input and an output, said input of said optical coupler being located with respect to said means for receiving such that said known spatial intensity distribution is incident on said input of said optical coupler, said optical coupler comprising means for converting said known intensity distribution to a predetermined spatial intensity distribution at a predetermined location, and a projection lens for projecting said predetermined spatial intensity distribution to provide a desired illumination pattern wherein said optical coupler comprises three optical elements, wherein said input for said optical coupler comprises an input surface for each of said optical elements and the input surface for one of said optical elements extends over at least one-half of the input for said optical coupler.

5. A headlamp according to claim 4 wherein said output for said optical coupler comprises an output surface for each of said optical elements, and the output surface for said one of said optical elements is in a shape of a portion of said desired illumination pattern.

6. A headlamp according to claim 5 wherein the output surfaces for second and third optical elements are on opposite sides of the output surface for said one of said optical elements.

7. A headlamp according to claim 6 wherein said projection lens comprises an aspheric lens and a spread lens.

8. A headlamp for a vehicle comprising:
   a holder for a single light-distribution optical fiber having an output end emanating light of know spatial-intensity distribution,
   an optical coupler having an input end adjacent said holder and including a plurality of elements, each of said plurality of elements positioned to have incident thereon light from a selected area of said light of known spatial intensity distribution and to alter the spatial intensity distribution of said light from said selected area to provide a predetermined spatial intensity distribution at an output of said coupler, and
   a projection lens projecting said predetermined spatial intensity distribution to a desired illumination pattern.

9. A headlamp according to claim 8 wherein each of said elements transmits said light from a selected area by total internal reflection.

10. A headlamp according to claim 9 wherein one of said elements extends from a central part of said input end to a peripheral part of said output.

11. A headlamp according to claim 8 wherein said plurality of elements include two elements that are contiguous at said input end and spaced from each other at said output.

12. A headlamp according to claim 11 wherein said projection lens comprises two aspheric lenses, each receiving light from a single one of said two elements.

13. A headlamp according to claim 8 wherein at least one of said optical elements comprises an opaque mask with an opening therein and at least one of said elements comprises a transmission filter at least partially overlying said opening.

* * * * *